(12) United States Patent
Delannoy et al.

(10) Patent No.: US 6,359,055 B1
(45) Date of Patent: *Mar. 19, 2002

(54) POLYAMIDE-BASED COMPOSITIONS AND ARTICLES MADE FROM THESE COMPOSITIONS

(75) Inventors: Vincent Delannoy, Mons; Jacques D'Heur, Brussels, both of (BE)

(73) Assignee: Solvay( Societe Anonyme), Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/233,719

(22) Filed: Apr. 26, 1994

Related U.S. Application Data

(63) Continuation of application No. 07/849,582, filed on Mar. 10, 1992, now abandoned.

(30) Foreign Application Priority Data

Mar. 14, 1991 (BE) ............................................. 09100242

(51) Int. Cl.$^7$ .............................. C08J 5/00; C08L 77/06; C08L 27/16
(52) U.S. Cl. ...................... 524/514; 525/179; 525/199
(58) Field of Search ................................ 525/179, 178, 525/199, 514

(56) References Cited

U.S. PATENT DOCUMENTS

| | | | | |
|---|---|---|---|---|
| 3,005,795 A | * | 10/1961 | Busse | .................. 525/178 |
| 3,125,547 A | | 3/1964 | Blatz et al. | |
| 3,968,071 A | * | 7/1976 | Miyamoto | .................. 524/606 |
| 4,442,254 A | * | 4/1984 | Aratani | .................. 524/413 |
| 4,785,050 A | | 11/1988 | Wittmann et al. | |
| 5,013,792 A | * | 5/1991 | Chapman | .................. 525/166 |
| 5,094,806 A | * | 3/1992 | Laughner | .................. 264/523 |

FOREIGN PATENT DOCUMENTS

| | | | | |
|---|---|---|---|---|
| FR | 2370081 | * | 6/1978 | |
| FR | 2 370 081 | | 6/1978 | |
| JP | 034223 | * | 10/1980 | |
| JP | 59/113059 | | 6/1984 | ......... C08L/101/00 |
| JP | 57-188834 | | 8/1984 | |
| JP | 62/072751 | | 4/1987 | |
| WO | WO 90/07549 | | 7/1990 | ........... C08L/33/02 |
| WO | WO 90/07555 | | 7/1990 | ........... C08L/77/00 |
| WO | WO 91/05007 | | 4/1991 | ........... C08L/23/00 |

OTHER PUBLICATIONS

Encyclopedia of Polymer Science and Engineering, J. Wiley & Sons, New York, 1988, vol. 11, pp. 345–347.*

Encyclopedia of Polymer Science and Engineering, Wiley & Sons, N.Y. (1988), v.11 pp.262–278.*

Database WPI, Accession No. 75–29586W [18], Derwent Publications Ltd., "Composition Contain Fluoride Polyamide Polyvinylidene Resin Thermosetting," Abstract, one page (JP–A–50 007 850, Jan. 27, 1975).

* cited by examiner

Primary Examiner—Jeffrey Mullis
(74) Attorney, Agent, or Firm—Venable; Marina V. Schneller

(57) ABSTRACT

Polyamide-based compositions whose processability is improved by the addition of a processing agent chosen from fluoropolymers.

These compositions are useful for molding shaped articles by extrusion, extrusion blowing, extrusion thermoforming or injection molding.

3 Claims, 1 Drawing Sheet

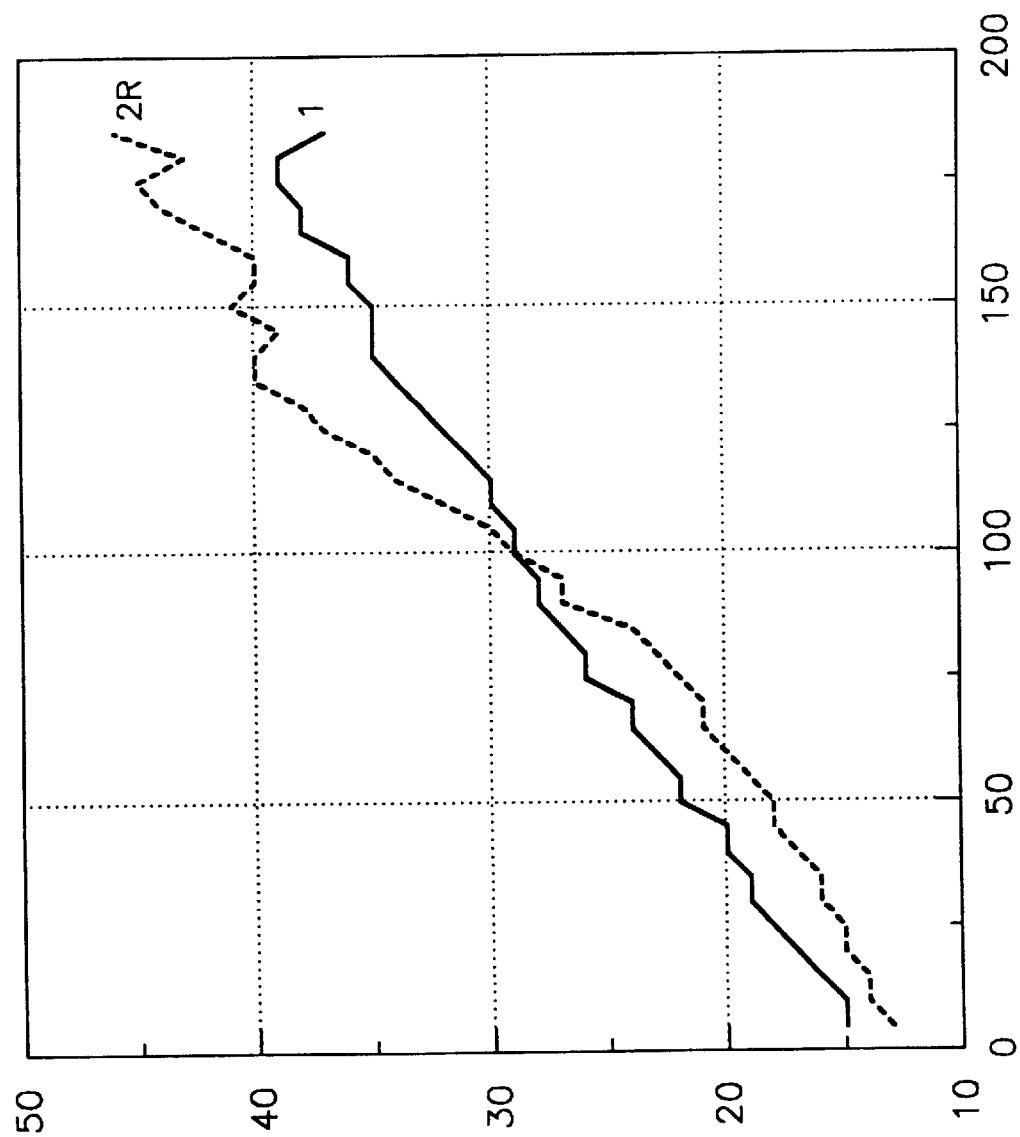

POLYAMIDE-BASED COMPOSITIONS AND ARTICLES MADE FROM THESE COMPOSITIONS

This application is a continuation, of application Ser. No. 07/849,582, Filed Mar. 10, 1992 now abandoned.

FIELD OF THE INVENTION

The present invention relates to polyamide-based compositions. It relates more particularly to polyamide-based compositions whose processability and especially mouldability is improved. It also relates to articles made from these compositions.

TECHNOLOGY REVIEW

Polyamides are thermoplastic polymers which are known for their mechanical and dielectric properties, for their resistance to elevated temperatures and for their chemical inertness.

In addition, semiaromatic polyamides exhibit gas barrier properties which justify their use on a large scale in the manufacture of plastic packaging, chiefly in the packaging of beverages and foodstuffs.

Nevertheless, these polymers are tricky to process. In fact, during their melt processing as performed in extrusion or injection processes a gradual fouling of the equipment is found, owing to the accumulation and/or degradation of material at the screws, the barrels, the dies and/or the filters. When this fouling becomes too great, a disorderly detachment of the excess material can be observed, and this results in the appearance of faults in the manufactured articles. In the particular case of extrusion processing, the fouling is in most cases located at the filters and its main consequence is a gradual blocking of the latter. The pressure measured in front of these filters then increases uniformly and crosses a critical threshold; the processing of the resin must be stopped to undertake a complete cleaning of the equipment.

SUMMARY OF THE INVENTION

The present invention is aimed at remedying this disadvantage and consequently providing polyamide-based compositions whose processability and especially mouldability is improved. To this end, it relates to compositions comprising:

A) 100 parts by weight of polyamide
B) from 0.001 to 5 parts by weight of a processing agent chosen from fluoropolymers.

BRIEF DESCRIPTION OF THE DRAWING

The FIGURE illustrates the processability of a composition according to the invention (1) compared to the processability of a conventional composition (2R). In the Figure the abscissa illustrates time expressed in minutes, and extrusion pressure, expressed in bars is shown as the ordinate.

DETAILED DESCRIPTION OF THE INVENTION

Polyamides which can be employed in compositions according to the invention are polycondensation polymers containing aromatic and/or aliphatic amide repeat groups.

Examples of polyamides are the polymers resulting from the polycondensation of, on the one hand, aliphatic, alicyclic or aromatic diamines with, on the other hand, aliphatic, alicyclic or aromatic dicarboxylic acids.

Examples of diamines which can be employed are hexamethylenediamine, decamethylenediamine, dodecamethylenediamine, 2,2,4- and 2,4,4-trimethylhexamethylenediamine, 1,3- and 1,4-bis (aminoethyl)cyclohexane, bis(p-aminocyclohexylmethane), m-xylylenediamine and p-xylylenediamine.

Examples of acids which can be employed are adipic, suberic, sebacic, glutaric, azelaic, cyclohexanedicarboxylic, isophthalic and terephthalic acids.

The polyamides involved may also be derived from monoaminomonocarboxylic acids such as 6-aminocaproic, 6-aminocaprylic, 6-aminolauric, 11-aminoundecanoic and 12-aminododecanoic acids or from lactams derived from these acids, such as, for example, $\epsilon$-caprolactam and $\omega$-dodecanolactam.

It is also possible to obtain polyamides which can be employed in the compositions according to the invention by polymerising these monoaminomonocarboxylic acids or these lactams with mixtures of diamines and of dicarboxylic acids as described above.

Polyamides derived from more than one amine and/or more than one acid or mixtures of different polyamides can also be employed in the compositions according to the invention.

Examples of particular polyamides which can be employed in the compositions according to the invention are polyhexamethylene adipamide (nylon 66), polycaprolactam (nylon 6) and the polyamide resulting from the polycondensation of hexamethylenediamine and dodecanedioic acid (nylon 612).

The polyamides which are preferred because they exhibit a number of advantages (low water uptake imparting good dimensional stability, high rigidity, good creep resistance, good dielectric properties etc) are semiaromatic polyamides obtained by polycondensation of xylylenediamines with linear $\alpha,\omega$-dicarboxylic aliphatic acids containing from 6 to 12 carbon atoms and most particularly polyamides obtained by polycondensation of m-xylylenediamine with adipic acid (called MXD6 hereinafter).

The compositions according to the invention additionally contain at least one processing agent chosen from fluoropolymers. Fluoropolymers are intended to denote polymers derived from monomers in which the fluorine/carbon atomic ratio is at least ½. These polymers must be preferably fluid when the polyamide is in the molten state. It is appropriate, therefore, that they should be fluid at temperatures of between 100 and 400° C., preferably between 125 and 360° C., more particularly between 200 and 350° C. Examples of such polymers which may be mentioned are the polymers derived from fluoroolefins such as vinyl fluoride, vinylidene fluoride, trifluoroethylene, chlorotrifluoroethylene, tetrafluoroethylene, hexafluoropropylene, hexafluoroisobutylene and perfluoroalkoxyolefins and copolymers of these compounds with each other and with unfluorinated olefins such as copolymers of vinylidene fluoride with chlorotrifluoroethylene or hexafluoropropylene and copolymers of ethylene with chlorotrifluoroethylene. Polymers which are more particularly preferred are vinylidene fluoride polymers and copolymers.

This processing agent is incorporated into the compositions according to the invention in variable quantities: from 0.001 to 5 parts by weight, preferably from 0.005 to 1 part by weight, more particularly from 0.01 to 0.5 parts by weight per 100 parts by weight of polyamide.

It is obvious that the processing agent may be introduced into the compositions according to the invention in the form of a single fluoropolymer or in the form of a mixture of fluoropolymers.

Besides the polyamide and the processing agent, the compositions according to the invention may contain usual additives such as stabilisers, pigments, dyes or antistatic agents. A conventional nucleating agent for polyamides may also be incorporated therein, such as talc and alkali metal and alkaline-earth metal phosphinates. When the polyamide is MXD6, a well-known nucleating agent is polyhexamethylene adipamide (nylon 66). The weight content of these various additives is generally less than 10 parts by weight per 100 parts by weight of polyamide.

Fibrous reinforcing agents may also be incorporated in these compositions, such as, for example, glass fibres, metal carbide fibres or carbon fibres, glass fibres being particularly preferred. These fibrous reinforcing agents may be incorporated into the compositions according to the invention in quantities of between 10 and 80 parts by weight, preferably between 20 and 70 parts by weight per 100 parts by weight of polyamide.

The preparation of the compositions according to the invention may be carried out using any of the methods known to the art. A particularly simple operating method comprises dry blending of the various constituents in the desired proportions.

It is also possible, in a first step, to prepare a primary mixture, called a masterbatch, of polyamide rich in fluoropolymer and containing the optional additives. The fluoropolymer content in this masterbatch is generally between 0.05 and 25% by weight, preferably between 0.5 and 10% by weight, more particularly between 1 and 6% by weight of the mixture. This primary mixture is introduced together with the polyamide during the conversion process in proportions which allow a composition according to the invention to be obtained.

The proportions of the various constituents of the composition according to the invention may optionally be modified during the processing.

The compositions according to the invention are capable of being processed by any of the conventional methods for the conversion of plastics, and more particularly by the extrusion, extrusion blowing, extrusion thermoforming and injection moulding processes. These compositions are suitable for the manufacture of shaped articles such as films, sheets, plates, containers, bags, pouches or pipes; these compositions are very suitable for the manufacture of shaped articles intended more particularly for the packaging of beverages and foodstuffs, such as containers, films and sheets.

These articles made from the compositions according to the invention may have monolayer structures consisting solely of the compositions according to the invention or multilayer structures in which at least one of the layers is based on the compositions according to the invention, the others being chosen from other polymers such as, for example, ethylene, propylene or vinyl chloride polymers or polyalkene terephthalates or mixtures thereof. The bonding between the constituent layers of these materials may be strengthened by layers based on adhesive resins. Resins which are known for this purpose are, for example: polyolefins modified with polar monomers, such as propylene polymers and ethylene polymers grafted with maleic anhydride, copolymers of ethylene with acrylic acid, ionomers derived from alkali metal or alkaline-earth metal salts and copolymers of ethylene with acrylic acid or with acrylates. In the case where it is desired to manufacture articles with a multilayer structure, coextrusion, coinjection or colamination techniques may be employed.

An unexpected advantage of the compositions according to the invention is their good processability. In fact, when they are being melt-processed a very marked reduction in the fouling of the equipment is found, and this results in an improvement in the appearance of the manufactured articles. In addition, in the particular case of extrusion processing, it is found that the fouling of filters is very markedly reduced and that it is possible to process large quantities of material continuously without the pressure measured in this region exceeding the critical threshold above which the equipment must be stopped and completely cleaned.

The following examples, in combination with the attached single figure to which reference is made, are used to illustrate the invention. This figure is a two-dimensional diagram in which the time, expressed in minutes, is shown as the abscissa, and the extrusion pressure, P, expressed in bars and as defined below, is shown as the ordinate. Curves 1 and 2R are typical of the behaviour of the compositions according to Examples 1 and 2R.

The processability of the compositions is tested by means of laboratory equipment specially designed for evaluating plastics and developed by the Brabender company and consisting of the coupling of an "extrusiometer" (model 832200) and of a "filtratest" (model 844303). This equipment makes it possible to reproduce faithfully the filter blocking problems encountered industrially during the extrusion of a thermoplastic composition. The test consists in extruding the composition in the extrusiometer fitted with an endless screw 19 mm in diameter (D) and 25D in length, in taking up the composition which is molten and homogenised in a gear pump and in forcing it to pass at a constant flow rate through a perforated plate and a series of filters.

The pressure, P (extrusion pressure, expressed in bars) before the series of filters is measured continuously and the quantity of material, Q, extruded during the test is weighed. The behaviour of the polymers is characterised by the change in the extrusion pressure during the test, by the extrusion pressure at the end of the test and by the parameter $\Delta p$ defined by the following relationship:

$$\Delta p = (P_f - P_i) \times 100 / P_i \times Q$$

in which $P_i$: initial extrusion pressure, expressed in bars, $P_f$: extrusion pressure at the end of the test, expressed in bars, Q: total quantity of material extruded during the test, expressed in kg, $\Delta p$: difference between the extrusion pressure measured at the beginning and at the end of the test, related to the total quantity of extruded material and expressed in %/kg.

EXAMPLE 1

1. Preparation of a Masterbatch

A composition containing the following is mixed for 15 minutes in a drum mixer:

97% by weight of an MXD6 polyamide resulting from the polycondensation of meta-xylene diamine and adipic acid, marketed under the trademark Nyref 6007 by Solvay & Cie 3% by weight of vinylidene fluoride-based polymer of vinylidene fluoride (90 weight percent) and propylene hexafluoride (10 weight percent), marketed under the trademark Solef 11010 by Solvay & Cie.

This masterbatch is then granulated on a Brabender granulator (model 881202).

2. Study of the Processability of the Composition

This masterbatch is introduced together with Nyref 6007 polyamide into the device employed for testing the thermoplastic compositions described above. The ratio of the percentage by weight of masterbatch to the percentage by weight of the polyamide is 4/96. This composition according to the invention, thus containing 0.12 parts by weight of fluoropolymer per 100 parts by weight of polyamide, is tested by following the procedure described above for three hours. The temperature of the composition as it leaves the extrusiometer is 260° C. The various measurements taken during this test are:

$P_i = 15$ $P_f = 37$ $Q = 4.23$ $\Delta P = 35$

Curve 1 in the single figure shows that the extrusion pressure increases during the test, but that its increase diminishes with time and therefore with the quantity of material processed. Since the extrusion pressure tends to stabilise, a large quantity of material can be processed without reaching the critical pressure above which the processing must be brought to a halt.

EXAMPLE 2R

This example is given by way of comparison.

A composition consisting solely of the polyamide of MXD6 type marketed under the trademark Nyref 6007 by Solvay & Cie is tested using a procedure which is similar in all respects to that of Example 1. The results of this test are:

$P_i = 13$ $P_f = 46$ $Q = 4.25$ $\Delta P = 60$

Curve 2R (see figure) shows an increasing rise in the extrusion pressure in the course of time. With this composition it is therefore not possible to process a large quantity of material without reaching the critical pressure above which the processing must be brought to a halt.

What is claimed is:

1. A polyamide-based composition having improved processability consisting of:
    (A) 100 parts by weight of polyamide selected from the group consisting of at least one polycondensation product of xylylenediamines with linear, α, ω-dicarboxylic aliphatic acids, containing from about 6 to about 12 carbon atoms,
    (B) from about 0.001 to 5 parts by weight of at least one processing agent selected from vinylidene fluoride polymers and copolymers which are fluid when said polyamide is in molten state,
    (C) less than 10 parts by weight of additives selected from the group consisting of stabilizers, pigments, dyes, antistatic agents and nucleating agents,
    (D) and optionally, between 10 and 80 parts by weight of fibrous reinforcing agents chosen from glass fibers, carbon fibers and metal carbide fibers.

2. A method of making shaped articles, comprising a step of molding a polyamide composition consisting of:
    (A) 100 parts by weight of polyamide selected from the group consisting of at least one polycondensation product of xylylenediamines with linear, α, ω-dicarboxylic aliphatic acids, containing from about 6 to about 12 carbon atoms,
    (B) from about 0.001 to 5 parts by weight of at least one processing agent selected from the group consisting of vinylidene fluoride polymers and copolymers which are fluid when said polyamide is in molten state,
    (C) less than 10 parts by weight of additives selected from the group consisting of stabilizers, pigments, dyes, antistatic agents and nucleating agents,
    (D) and optionally, between 10 and 80 parts by weight of fibrous reinforcing agents selected from the group consisting of glass fibers, carbon fibers and metal carbide fibers.

3. A polyamide-based composition according to claim 1, wherein the polyamide is obtained by polycondensation of m-xylylenediamine with adipic acid.

* * * * *